United States Patent Office 3,749,775
Patented July 31, 1973

3,749,775
INSECTICIDAL 2-AMINOTHIAZOLE PHOSPHATES AND PHOSPHONATES
Llewellyn W. Fancher, Orinda, Calif., assignor to Stauffer Chemical Company
No Drawing. Original application July 7, 1969, Ser. No. 839,626, now Patent No. 3,591,600. Divided and this application Jan. 28, 1971, Ser. No. 110,639
Int. Cl. A01n 9/36
U.S. Cl. 424—200                    21 Claims

ABSTRACT OF THE DISCLOSURE

The use of compounds of the formula $$\begin{array}{c} R \\ R^1 \end{array} \diagdown_S^N \diagup_{N-\overset{R^2}{C}CH_2S\overset{O}{\overset{\|}{P}} \diagdown_{R^4}^{S\ R^3}}$$

in which

R is hydrogen; alkyl; naphthyl; phenyl; mono or di substituted phenyl wherein the substituents are halogen, nitro, alkyl; or the group —$CH_2$—S—$R^5$ in which $R^5$ is alkyl, phenyl, benzyl, or halophenyl;
$R^1$ is hydrogen; alkyl; phenyl; mono or di substituted phenyl wherein the substituents are halogen, nitro, alkyl; nitro; or halogen;
$R^2$ is hydrogen, alkyl; allyl or phenyl;
$R^3$ is alkoxy and
$R^4$ is alkoxy or alkyl as insecticides and acaricides.

---

This application is a divisional of copending application, Ser. No. 839,626, filed July 7, 1969 now U.S. 3,591,600.

This invention relates to the use of certain novel chemical compounds as insecticides and acaricides, more particularly, the compounds are certain 2-aminothiazole phosphates and phosphonates.

The compounds of this invention that are useful as insecticides and acaricides are those having the formula:

$$\begin{array}{c} R \\ R^1 \end{array} \diagdown_S^N \diagup_{N-\overset{R^2}{C}CH_2S\overset{O}{\overset{\|}{P}} \diagdown_{R^4}^{S\ R^3}}$$

in which

R is hydrogen; alkyl having 1 to 5 carbon atoms, preferably methyl; naphthyl; phenyl, mono or di substituted phenyl wherein the substituents are halogen, preferably chlorine, nitro, alkyl having 1 to 5 carbon atoms, preferably methyl or the group —$CH_2$—S—$R^5$ in which $R^5$ is alkyl having 1 to 5 carbon atoms, preferably 1 to 2 carbon atoms, phenyl, benzyl, or halophenyl, preferably chlorphenyl;
$R^1$ is hydrogen, alkyl having 1 to 5 carbon atoms, preferably methyl, phenyl, mono or di substituted phenyl wherein the substituents are halogen, preferably chlorine, nitro, alkyl having 1 to 5 carbon atoms, preferably methyl; nitro; or halogen, preferably chlorine;
$R^2$ is hydrogen, alkyl having 1 to 4 carbon atoms, preferably methyl; allyl or phenyl;
$R^3$ is alkoxy having 1 to 5 carbon atoms, and
$R^4$ is alkoxy having 1 to 5 carbon atoms, preferably 1 to 3 carbon atoms, or alkyl having 1 to 5 carbon atoms, preferably 1 to 2 carbon atoms.

The term halogen as used herein includes chlorine, bromine, iodine, and fluorine. The term halo as used herein includes chloro, bromo, iodo, and fluoro.

The compounds having the formula $$\begin{array}{c} R \\ R^1 \end{array} \diagdown_S^N \diagup_{N-\overset{R^2}{C}CH_2S\overset{O}{\overset{\|}{P}} \diagdown_{R^4}^{S\ R^3}}$$

in which R, $R^1$, $R^2$ and $R^3$ are as defined above by the following reactions:

(a) $\begin{array}{c} R^3 \\ R^4 \end{array} \diagdown \overset{S}{\underset{\uparrow}{P}}-SH + Et_3N \xrightarrow{DMF} \begin{array}{c} R^3 \\ R^4 \end{array} \diagdown \overset{S}{\underset{\uparrow}{P}}-SH \cdot NEt_3$ (b) $\begin{array}{c} R^3 \\ R^4 \end{array} \diagdown \overset{S}{\underset{\uparrow}{P}}-SH \cdot Et_3 + ClCH_2\overset{OR_2}{\overset{\|}{C}}N \begin{array}{c} N \\ \diagdown \end{array}_S \diagup^R \diagup_{R^1} \xrightarrow[\text{1-2 hrs.}]{DMF}$ $$\begin{array}{c} R \\ R^1 \end{array} \diagdown_S^N \diagup_{N-\overset{R^2}{C}CH_2S\overset{O}{\overset{\|}{P}} \diagdown_{R^4}^{S\ R^3}} + Et_3N \cdot HCl$$

The reaction of a haloacetamide with a salt of an organic phosphate to form an acetamido phosphate is well-known:

$$RR^1N\overset{O}{\overset{\|}{C}}CH_2X + \overset{\oplus\ominus}{B}\overset{S}{\underset{\uparrow}{S}}-P(OR^2)_2 \longrightarrow$$

$$RR^1N\overset{O}{\overset{\|}{C}}CH_2SP(OR^2)_2 + \overset{\oplus\ominus}{BX}$$

The same general method is used in the preparation of the compounds of this invention; however, certain modifications of the above reaction have been made to simplify the procedure and to insure in most instances, high yields. The modifications include the use of anhydrous triethylamine which obviates the isolation of phosphate salt, and dimethyl formamide as a solvent medium which facilitates and promotes the reaction.

Although other solvents such as ketones, alcohols, benzene-$H_2O$ mixtures, etc., can be used, DMF has been found most advantageous with regard to reaction times and yields. It has also been found that a small excess of triethylamine is advantageous in bringing the reaction to completion.

After completion of the reaction between the chloroacetamide and the phosphate, or phosphonate amine salt, the product is conveniently isolated by pouring the mixture into water. If the product is a solid, it is filtered off and recrystallized if desired. If the product is a liquid, it can be extracted with a solvent such as benzene, chloroform, etc.

Chloroacetamide derivatives are used for economic reasons; however, bromo or iodoacetamides can also be used.

Preparation of the compounds of this invention is illustrated by the following examples.

EXAMPLE I

2,O,O-diethylphosphorodithioylacetamidothiazole $$\begin{array}{c} \phantom{R^1} \\ \phantom{R^1} \end{array} \diagdown_S^N \diagup_{NH\overset{O}{\overset{\|}{C}}CH_2S\overset{O}{\overset{\|}{P}}(OC_2H_5)_2}$$

18.6 gm. (0.1 M) of diethyl dithiophosphoric acid is diluted with 10 ml. of dimethyl formamide. The mixture is cooled in an ice-bath and made slightly basic (below 30° C.) with anhydrous triethylamine (about 13.8 cc.; 0.1 M), is used). This solution is then added to 12.3 gm. (0.07 M) of 2-chloroacetamidothiazole dissolved in 50 ml. of dimethylformamide. A moderate temperature rise occurs on mixing. The reaction is completed by stirring at 50–60° C. for one hour. The reaction mixture is poured into 200 ml. of ice-water and the solid, which separated, is filtered off, washed with cold water, and air-dried to give the desired product, 21.4 gm. (94% of theory), M.P. 121–124° C.

*Analysis.*—Theory (percent): C, 33.1; H, 4.61; N, 8.59; P, 9.51; S, 29.5. Found (percent): C, 32.55; H, 4.56; N, 8.35; P, 9.61; S, 28.85.

The following is a table of certain selected compounds that are preparable according to the procedure described hereto. Compound numbers are assigned to each compound and are used throughout the remainder of the application.

TABLE I

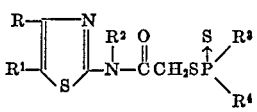

| Compound No. | R | R¹ | R² | R⁴ | R³ | $N_D^{30}$ or M.P. |
|---|---|---|---|---|---|---|
| 1 | H | H | H | $C_2H_5O$ | $C_2H_5O$ | 121–124° C. |
| 2 | H | H | H | $CH_3O$ | $CH_3O$ | 113–115° C. |
| 3 | H | H | H | $C_2H_5$ | $i-C_3H_7O$ | 93–95° C. |
| 4 | $CH_3$ | H | H | $C_2H_5O$ | $C_2H_5O$ | 1.5598. |
| 5 | $CH_3$ | H | H | $i-C_3H_7O$ | $i-C_3H_7O$ | 1.5560. |
| 6 | $CH_3$ | H | H | $n-C_3H_7O$ | $n-C_3H_7O$ | 1.5428. |
| 7 | $CH_3$ | H | H | $C_2H_5$ | $i-C_3H_7O$ | 1.5682. |
| 8 | $CH_3$ | H | H | $CH_3O$ | $CH_3O$ | 1.5688. |
| 9 | $C_6H_5$ | H | H | $C_2H_5O$ | $C_2H_5O$ | 1.6201. |
| 10 | Same as above | H | H | $CH_3O$ | $CH_3O$ | 1.6153. |
| 11 | do | H | H | $C_2H_5$ | $i-C_3H_7O$ | 1.6158. |
| 12 | do | H | H | $n-C_3H_7O$ | $n-C_3H_7O$ | 1.6090. |
| 13 | H | H | H | $C_2H_5$ | $C_2H_5$ | 93–95° C. |
| 14 | $CH_3$ | H | H | $C_2H_5$ | $C_2H_5O$ | 116–123° C. |
| 15 | $C_6H_5$ | H | H | $C_2H_5$ | $C_2H_5O$ | 70–74° C. |
| 16 | $Cl-C_6H_4-$ | H | H | $C_2H_5$ | $C_2H_5O$ | 1.6228. |
| 17 | $NO_2-C_6H_4-$ | H | H | $CH_3O$ | $CH_3O$ | 117–120° C. |
| 18 | Same as above | H | H | $C_2H_5O$ | $C_2H_5O$ | |
| 19 | $CH_3$ | $CH_3$ | H | $C_2H_5O$ | $C_2H_5O$ | 1.5600. |
| 20 | $CH_3$ | $CH_3$ | H | $C_2H_5$ | $i-C_3H_7O$ | 1.5646. |
| 21 | $CH_3$ | $CH_3$ | H | $C_2H_5$ | $i-C_4H_9O$ | 1.5523. |
| 22 | $CH_3$ | $C_6H_5$ | H | $C_2H_5O$ | $C_2H_5O$ | 114–119° C. |
| 23 | $CH_3$ | Same as above | H | $C_2H_5$ | $CH_3O$ | 110–111° C. |
| 24 | $CH_3$ | do | H | $C_2H_5$ | $C_2H_5O$ | 132–135° C. |
| 25 | H | H | H | $C_2H_5$ | $i-C_4H_9O$ | 1.5866. |
| 26 | $CH_3$ | $C_6H_5$ | H | $CH_3O$ | $CH_3O$ | 1.5831. |
| 27 | H | H | H | $C_2H_5$ | $CH_3O$ | 90–93° C. |
| 28 | $C_6H_5$ | H | H | $C_2H_5$ | $i-C_4H_9O$ | 1.5900. |
| 29 | Same as above | H | H | $C_2H_5$ | $CH_3O$ | 1.6175. |
| 30 | $CH_3$ | H | H | $C_2H_5$ | $i-C_4H_9O$ | 1.5500. |
| 31 | $CH_3$ | H | H | $C_2H_5$ | $CH_3O$ | 1.5775. |
| 32 | H | $Cl-C_6H_4-S-$ | H | $C_2H_5O$ | $C_2H_5O$ | 1.6080. |
| 33 | $(CH_3)_2C_6H_3-$ | H | H | $C_2H_5O$ | $C_2H_5O$ | 105–108° C. |
| 34 | Same as above | H | H | $C_2H_5$ | $i-C_3H_7O$ | 1.5978. |
| 35 | $C_2H_5SCH_2$ | H | H | $C_2H_5O$ | $C_2H_5O$ | ≈40° C. |
| 36 | $C_2H_5SCH_2$ | H | H | $C_2H_5$ | $C_2H_5O$ | 1.5963. |
| 37 | $Cl-C_6H_4-$ | H | H | $C_2H_5O$ | $C_2H_5O$ | 1.5920. |
| 38 | H | $NO_2$ | H | $C_2H_5$ | $C_2H_5O$ | 83–86° C. |
| 39 | H | Br | H | $C_2H_5$ | $C_2H_5O$ | 77–80° C. |
| 40 | $NO_2-C_6H_4-$ | H | H | $C_2H_5$ | $C_2H_5O$ | 135–138° C. |
| 41 | H | $NO_2$ | H | $C_2H_5O$ | $C_2H_5O$ | 88–90° C. |
| 42 | H | Br | H | $C_2H_5O$ | $C_2H_5O$ | 106–108° C. |
| 43 | $C_2H_5SCH_2$ | H | H | $C_2H_5$ | $CH_3O$ | 1.5635. |
| 44 | H | Br | H | $C_2H_5$ | $CH_3O$ | 100–102° C. |
| 45 | $CH_3$ | H | $CH_3$ | $C_2H_5$ | $C_2H_5O$ | 1.5861. |
| 46 | $CH_3$ | H | $CH_3$ | $C_2H_5O$ | $C_2H_5O$ | 1.5700. |
| 47 | $CH_3$ | H | $CH_3$ | $C_2H_5$ | $CH_3O$ | 1.5910. |

TABLE I—Continued

| Compound No. | R | R¹ | R² | R⁴ | R³ | $N_D^{30}$ or M.P. |
|---|---|---|---|---|---|---|
| 48 | ⌬—CH₂SCH₃ | H | H | | $C_2H_5O$ | $C_2H_5O$ | 1.5943. |
| 49 | $CH_3$ | H | $CH_2CH$—$CH_2$ | $C_2H_5$ | $C_2H_5O$ | 1.5681. |
| 50 | $CH_3$ | H | $CH_2CH$—$CH_2$ | $C_2H_5$ | $C_2H_5O$ | 1.5620. |
| 51 | $CH_3$ | H | $CH_2CH$—$CH_2$ | $C_2H_5$ | $i$-$C_3H_7O$ | 1.5620. |
| 52 | $CH_3$ | H | $CH_2CH$—$CH_2$ | $C_2H_5$ | $i$-$C_4H_9O$ | 1.5590. |
| 53 | $CH_3$ | H | ⌬ | $C_2H_5$ | $C_2H_5O$ | 1.5953. |
| 54 | $CH_3$ | H | Same as above | $C_2H_5O$ | $C_2H_5O$ | 1.5670. |
| 55 | $CH_3$ | H | do | $C_2H_5$ | $i$-$C_3H_7O$ | 1.5701. |
| 56 | $CH_3$ | H | do | $C_2H_5$ | $i$-$C_4H_9O$ | 1.5685. |
| 57 | H | H | $CH_2CH$—$CH_2$ | $C_2H_5$ | $C_2H_5O$ | 1.5800. |
| 58 | H | H | $CH_2CH$—$CH_2$ | $C_2H_5O$ | $C_2H_5O$ | 1.5640. |
| 59 | $C_2H_5SCH_2$ | H | H | $C_2H_5$ | $i$-$C_4H_9O$ | 1.5755. |
| 60 | $NO_2$—⌬ | H | H | $C_2H_5$ | $i$-$C_3H_7O$ | 65–68° C. |
| 61 | Same as above | H | H | $C_2H_5$ | $CH_3O$ | 142–146° C. |
| 62 | ⌬—CH₂SCH₃ | H | H | $C_2H_5$ | $C_2H_5O$ | 1.5988. |
| 63 | $CH_3$ | Cl—⌬—Cl | H | $C_2H_5O$ | $C_2H_5O$ | 109–111° C. |
| 64 | $CH_3$ | Same as above | H | $C_2H_5$ | $C_2H_5O$ | 116–119° C. |
| 65 | $CH_3$ | do | H | $C_2H_5$ | $i$-$C_3H_7O$ | Waxy solid. |
| 66 | $CH_3$ | do | H | $C_2H_5$ | $i$-$C_4H_9O$ | 1.5980. |
| 67 | $CH_3$ | do | H | $C_2H_5$ | $CH_3O$ | 138–141° C. |
| 68 | ⌬⌬ (naphthyl) | H | H | $C_2H_5O$ | $C_2H_5O$ | 169–174° C. |
| 69 | Same as above | H | H | $C_2H_5$ | $C_2H_5O$ | 1.6328. |
| 70 | do | H | H | $C_2H_5$ | $i$-$C_3H_7O$ | 1.6240. |
| 71 | do | H | H | $C_2H_5$ | $i$-$C_4H_9O$ | 1.6195. |
| 72 | do | H | H | $C_2H_5$ | $CH_3O$ | 140–144° C. |
| 73 | Cl—⌬—$SCH_2$ | H | H | $C_2H_5O$ | $C_2H_5O$ | 1.6070. |
| 74 | Same as above | H | H | $C_2H_5$ | $C_2H_5O$ | 1.6165. |
| 75 | $CH_3SCH_2$ | H | H | $C_2H_5O$ | $C_2H_5O$ | 1.5900. |
| 76 | $CH_3SCH_2$ | H | H | $C_2H_5$ | $C_2H_5O$ | 1.5940. |

Insecticidal evaluation tests

The following insect species were used in evaluation tests for insecticidal activity:

(1) Housefly (HF)—*Musca domestica* (Linn.)
(2) Lygus Bug (LB)—*Lygus hesperus* (Knight)
(3) Bean Aphid (BA)—*Aphis fabae* (Scop.)

The Housefly (HF) was used in evaluation tests of selected compounds as insecticides by the following procedure. A stock solution containing 100 μg./ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg./per Petri dish to that at which 50% mortality was attained. The Petri dishes were placed in a circular cardboard cage, closed on the bottom with cellophane and covered on top with cloth netting. Twenty-five female houseflies, three to five days old were introduced into the cage and the percent mortality was recorded after 48 hours. The LD–50 values are expressed in terms of μg. per 25 female flies. The results of this insecticidal evaluation test are given in Table II under "HF."

In the Lygus Bug (LB) *Lygus hesperus* test, ten to twenty-five two-week old nymphs of Lygus Bug were placed in separate circular cardboard cages sealed on one end with cellophane and covered by a cloth netting on the other. Aliquots of the toxicants, dissolved in an appropriate solvent, were diluted in water containing 0.002% of a wetting agent, Sponto 221® (a polyoxyether of alkylated phenols blended with organic sulfonates). Test concentrations ranged from 0.05% downward to that at which 50% mortality was obtained. Each of the aqueous suspensions of the candidate compounds were sprayed onto the insect through the cloth netting by means of a hand-spray gun. Percent mortality in each case recorded after 24 and 72 hours counts were made to determine living and dead insects. The LD–50 values expressed as percent of toxicant in the aqueous spray were calculated and recorded. These values are reported under the column "LB" in table II.

The insect species Black Bean Aphid (BA) *Aphis fabae* (Scop.) were also employed in the test for insecticidal activity. Young nasturtium (Tropacolum sp.) plants, approximately 2 to 3 inches tall, were used as the host plants for the Bean Aphid. The host plant was infested with approximately 50–75 of the aphids. The test chemical was dissolved in acetone, added to water which contained a small amount of Sponto 221®, an emulsifying agent. The solution was applied as a spray to the infested plants. Concentrations ranged from 0.05 percent downward until an LD–50 value was achieved. These results are given in Table II under the Column "BA."

Acaricidal evaluation test

The two-spotted mite (2SM), *Tetranychus urticae* (Kock), was employed in tests for miticides. Young pinto bean plants or lima bean plants (Phaseolus sp.) in the primary leaf stage were used as the host plants. The young pinto bean plants were infested with about 100 mites of various ages. Dispersions of candidate materials were prepared by dissolving 0.1 gram in 10 ml. of a suitable solvent, usually acetone. Aliquots of the toxicant solutions were suspended in water containing 0.002% v./v. Sponto 221®, polyoxyethylene ether sorbitan monolaurate, an emulsifying agent, the amount of water being sufficient to give concentrations of active ingredient ranging from 0.05% to that at which 50% mortality was obtained. The test suspensions were then sprayed on the infested plants to the point of run off. After 7 days, mortalities of the post-embryonic form was determined. The percentage of kill was determined by comparison with control plants which had not been sprayed with candidate compounds. The LD-50 value was calculated using well-known procedures. These values are reported under the columns "2SM-PE" and "2SM-Eggs," in Table II.

Systemic evaluation test

This test evaluates the root absorption and upward translocation of the candidate systemic compound. The bean Aphid (BA) *Aphis fabae* (Scop.) was employed in the test for Systemic Activity.

Young nasturtium plants were used as the host plants for the Bean Aphid. The host plants were transplanted into one pound of soil that had been treated with the candidate compound. Immediately after planting in the treated soil, the plants were infested with the aphids. Concentrations of toxicant in the soil ranged from 10 p.p.m. per pound of soil downward until an LD-50 value was obtained. Mortality was recorded after 72 hours.

The percentage of kill of the test species was determined by comparison with control plants placed in distilled water or untreated soil. The LD-50 values were calculated. These systemic test results are reported in Table II under the column "BA-Sys."

TABLE II.—(LD50 VALUES)
Thiazole phosphates

| Compound Number | HF, µg. | LB, percent | BA, percent | BA-sys., p.p.m. | 2SM PE, percent | 2SM Eggs, percent |
|---|---|---|---|---|---|---|
| 1 | 30 | >.05 | .005 | 8 | >.05 | >.05 |
| 2 | >100 | >.05 | .003 | 5 | >.05 | >.05 |
| 3 | 8 | .03 | .0003 | 3 | .03 | .03 |
| 4 | >100 | >.05 | .0008 | 3 | .03 | .03 |
| 5 | >100 | >.05 | .05 | | .05 | >.05 |
| 6 | >100 | .05 | >.05 | | >.05 | >.05 |
| 7 | 30 | .04 | .0003 | 3 | .008 | .01 |
| 8 | >100 | >.05 | .008 | 8 | >.05 | >.05 |
| 9 | 30 | >.05 | .03 | >10 | .03 | .008 |
| 10 | 65 | >.05 | >.05 | | .05 | >.05 |
| 11 | 30 | >.05 | .001 | >10 | .005 | .005 |
| 12 | >100 | >.05 | >.05 | | >.05 | >.05 |
| 13 | 7.5 | .03 | .0003 | 5 | .001 | .01 |
| 14 | 30 | .01 | .0003 | 8 | .003 | .03 |
| 15 | 15 | >.05 | .003 | 8 | .005 | .03 |
| 16 | 15 | >.05 | .003 | >10 | .008 | .03 |
| 17 | >100 | >.05 | >.05 | | >.05 | >.05 |
| 18 | 30 | >.05 | .03 | >10 | >.05 | >.05 |
| 19 | 80 | >.05 | .003 | >10 | .03 | .03 |
| 20 | 30 | .05 | .0008 | 3 | .008 | .03 |
| 21 | 30 | .03 | .003 | 8 | .005 | .008 |
| 22 | >100 | >.05 | >.05 | | .03 | >.05 |
| 23 | >100 | >.05 | >.05 | | .01 | .03 |
| 24 | >100 | >.05 | .008 | >10 | .003 | .005 |
| 25 | 30 | .03 | .0005 | >10 | .003 | .005 |
| 26 | >100 | | >.05 | | >.05 | >.05 |
| 27 | 30 | >.05 | .008 | >10 | .01 | .03 |
| 28 | 30 | .05 | .003 | >10 | .01 | .01 |
| 29 | 12 | >.05 | .005 | >10 | .03 | >.05 |
| 30 | 80 | .05 | .001 | >10 | .001 | .03 |
| 31 | 60 | >.05 | .003 | >10 | .03 | >.05 |
| 33 | >100 | | >.05 | | >.05 | >.05 |
| 34 | >100 | >.05 | .003 | >10 | .008 | >.05 |
| 35 | >100 | .01 | .003 | >10 | >.05 | >.05 |
| 36 | 30 | .008 | .003 | >10 | .008 | .008 |
| 37 | 80 | >.05 | .05 | >10 | .05 | >.05 |
| 38 | 35 | .03 | .005 | >10 | .03 | .03 |
| 39 | 30 | .05 | .005 | >10 | .03 | .03 |
| 40 | 8 | .05 | .03 | >10 | .01 | .05 |
| 41 | 100 | .05 | .008 | >10 | .03 | .05 |
| 42 | >100 | | >.05 | | >.05 | >.05 |
| 43 | 60 | .005 | .003 | >10 | .03 | .03 |
| 44 | >100 | >.05 | .005 | >10 | .05 | >.05 |
| 45 | 6.8 | .05 | .0008 | >10 | .003 | .003 |
| 46 | 30 | >.05 | .0005 | >10 | .03 | .03 |
| 47 | 30 | >.05 | .0008 | 10 | .01 | .01 |

TABLE II—Continued

| Compound Number | HF, µg. | LB, percent | BA, percent | BA-sys., p.p.m. | 2SM PE, percent | 2SM Eggs, percent |
|---|---|---|---|---|---|---|
| 48 | 100 | | >.05 | | >.05 | >.05 |
| 49 | 9 | >.05 | .003 | >10 | .01 | .03 |
| 50 | 30 | >.05 | .003 | >10 | .03 | .03 |
| 51 | 30 | >.05 | .003 | >10 | .008 | .03 |
| 52 | 15 | >.05 | .01 | >10 | .008 | .03 |
| 53 | 30 | >.05 | .01 | >10 | .008 | .008 |
| 54 | 50 | >.05 | .05 | >10 | >.05 | >.03 |
| 55 | 30 | >.05 | .03 | >10 | .003 | .005 |
| 56 | 35 | >.05 | >.05 | >10 | .008 | .01 |
| 57 | 9 | .03 | .003 | >10 | .008 | .03 |
| 58 | 11 | .05 | .003 | >10 | .03 | .03 |
| 59 | 30 | .005 | .008 | >10 | .008 | .01 |
| 60 | 8.5 | .008 | .003 | >10 | .03 | >.05 |
| 61 | 6.5 | >.05 | >.05 | | | |
| 62 | 90 | .03 | .03 | >10 | .03 | >.05 |
| 63 | >100 | | >.05 | >1 | .05 | >.05 |
| 64 | 30 | .01 | .008 | 8 | .01 | >.05 |
| 65 | 80 | .03 | .003 | >10 | .03 | >.05 |
| 66 | >100 | .03 | .01 | >10 | .03 | >.05 |
| 67 | 15 | >.05 | >.05 | >10 | >.05 | >.05 |
| 68 | >100 | >.05 | .008 | >10 | .01 | .05 |
| 69 | >100 | .03 | .003 | >10 | .005 | .03 |
| 70 | >100 | >.05 | .003 | >10 | .008 | >.05 |
| 71 | >100 | | .003 | >10 | .06 | .03 |
| 72 | >100 | | .05 | 10 | .01 | .05 |
| 73 | 100 | | .05 | | .03 | .05 |
| 74 | 95 | >.05 | .008 | 10 | .008 | .01 |
| 75 | 100 | .01 | .005 | >10 | .03 | >.05 |
| 76 | >100 | .003 | .03 | >10 | .01 | >.05 |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media although it may be convenient to dissolve the toxicant directly in a solvent such as kerosene, fuel oil, xylene, alkylated naphthalenes or the like and use such organic solutions directly. However, the more common procedures is to employ dispersions of the toxicant in an aqueous medium and such compositions may be produced by forming a concentrated solution of the toxicant in a suitable organic solvent followed by dispersion in water, usually with the aid of surface active agents. The latter, which may be anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters, and other polyoxyethylene surface active agents. The proportion of these agents commonly comprises 1–15% by weight of the pesticidal compositions although the proportion is not critical and may be varied to suit any particular situation.

I claim:

1. The method of controlling insects comprising applying to the habitat thereof an insecticidally effective amount of a compound of the formula

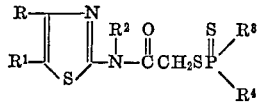

in which

R is hydrogen; alkyl having 1 to 5 carbon atoms; naphthyl; phenyl; mono or di substituted phenyl, wherein the substituents are halogen, nitro, alkyl having 1 to 5 carbon atoms; or the group —$CH_2$—S—$R^5$ in which $R^5$ is alkyl having 1 to 5 carbon atoms, phenyl, benzyl, or halophenyl;

$R^1$ is hydrogen, alkyl having 1 to 5 carbon atoms, nitro, halogen, phenyl, mono or di substituted phenyl wherein the substituents are halogen, nitro, or alkyl having 1 to 5 carbon atoms;
$R^2$ is hydrogen, alkyl having 1 to 4 carbon atoms; allyl or phenyl;
$R^3$ is alkoxy having 1 to 5 carbon atoms, and
$R^4$ is alkoxy having 1 to 5 carbon atoms, or alkyl having 1 to 5 carbon atoms.

2. The method of claim 1 in which R is hydrogen, $R^1$ is hydrogen, $R^2$ is hydrogen, $R^3$ is alkoxy having 1 to 5 carbon atoms, and $R^4$ is alkyl having 1 to 5 carbon atoms.

3. The method of claim 1 in which R is methyl, $R^1$ is hydrogen, $R^2$ is hydrogen, $R^3$ is alkoxy having 1 to 5 carbon atoms, and $R^4$ is alkyl having 1 to 5 carbon atoms.

4. The method of claim 1 in which R is nitrophenyl, $R^1$ is hydrogen, $R^2$ is hydrogen, $R^3$ is alkoxy having 1 to 5 carbon atoms, and $R^4$ is alkyl having 1 to 5 carbon atoms.

5. The method of claim 1 in which R is hydrogen, $R^1$ is hydrogen, $R^2$ is hydrogen, $R^3$ is alkoxy having 1 to 5 carbon atoms, and $R^4$ is alkoxy having 1 to 5 carbon atoms.

6. The method of claim 2 in which $R^3$ is isopropoxy, and $R^4$ is ethyl.

7. The method of claim 2 in which $R^3$ is ethoxy, and $R^4$ is ethyl.

8. The method of claim 3 in which $R^3$ is ethoxy, and $R^4$ is ethyl.

9. The method of claim 4 in which $R^3$ is isopropoxy, and $R^4$ is ethyl.

10. The method of claim 2 in which $R^3$ is isobutoxy, and $R^4$ is ethyl.

11. The method of controlling acarids comprising applying thereto an acaricidally effective amount of a compound of the formula

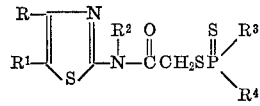

in which

R is hydrogen; alkyl having 1 to 5 carbon atoms; naphthyl; phenyl; mono or di substituted phenyl, wherein the substituents are halogen, nitro, alkyl having 1 to 5 carbon atoms; or the group $-CH_2-S-R^5$ in which $R^5$ is alkyl having 1 to 5 carbon atoms, phenyl, benzyl, or halophenyl;
$R^1$ is hydrogen, alkyl having 1 to 5 carbon atoms, nitro, halogen, phenyl, mono or di substituted phenyl wherein the substituents are halogen, nitro, or alkyl having 1 to 5 carbon atoms;
$R^2$ is hydrogen, alkyl having 1 to 4 carbon atoms; allyl or phenyl;
$R^3$ is alkoxy having 1 to 5 carbon atoms, and
$R^4$ is alkoxy having 1 to 5 carbon atoms, or alkyl having 1 to 5 carbon atoms.

12. The method of claim 11 in which R is hydrogen, $R^1$ is hydrogen, $R^2$ is hydrogen, $R^3$ is alkoxy, having 1 to 5 carbon atoms, and $R^4$ is alkyl having 1 to 5 carbon atoms.

13. The method of claim 11 in which R is phenyl, $R^1$ is hydrogen, $R^2$ is hydrogen, $R^3$ is alkoxy having 1 to 5 carbon atoms, and $R^4$ is alkyl having 1 to 5 carbon atoms.

14. The method of claim 11 in which R is methyl, $R^1$ is hydrogen, $R^2$ is methyl, $R^3$ is alkoxy having 1 to 5 carbon atoms, and $R^4$ is alkyl having 1 to 5 carbon atoms.

15. The method of claim 11 in which R is methyl, $R^1$ is hydrogen, $R^2$ is phenyl, $R^3$ is alkoxy having 1 to 5 carbon atoms, and $R^4$ is alkyl having 1 to 5 carbon atoms.

16. The method of claim 11 in which R is hydrogen, $R^1$ is hydrogen, $R^2$ is phenyl, $R^3$ is alkoxy having 1 to 5 carbon atoms, and $R^4$ is alkyl having 1 to 5 carbon atoms.

17. The method of claim 12 in which $R^3$ is ethoxy, and $R^4$ is ethyl.

18. The method of claim 12 in which $R^3$ is isobutoxy and $R^4$ is ethyl.

19. The method of claim 15 in which $R^3$ is isopropoxy, and $R^4$ is ethyl.

20. The method of claim 14 in which $R^3$ is ethoxy, and $R^4$ is ethyl.

21. The method of claim 13 in which $R^3$ is isopropoxy, and $R^4$ is ethyl.

No references cited.

ALBERT T. MEYERS, Primary Examiner
D. W. ROBINSON, Assistant Examiner

U.S. Cl. X.R.
260—306.8